Dec. 29, 1970 TAKAO ORITA ET AL 3,550,289
ELECTRONIC LANGUAGE TEACHING SYSTEM
Filed Jan. 24, 1969 7 Sheets-Sheet 1

INVENTORS
TAKAO ORITA
MASAHIRO KOSAKA
TADAMASA FUJITA

BY
ATTORNEYS

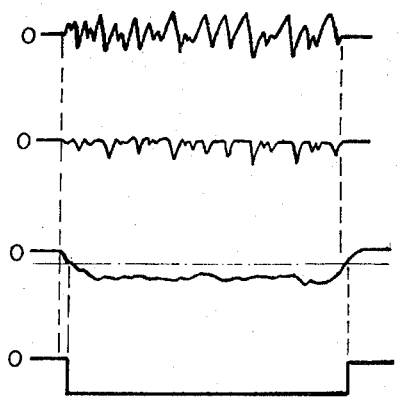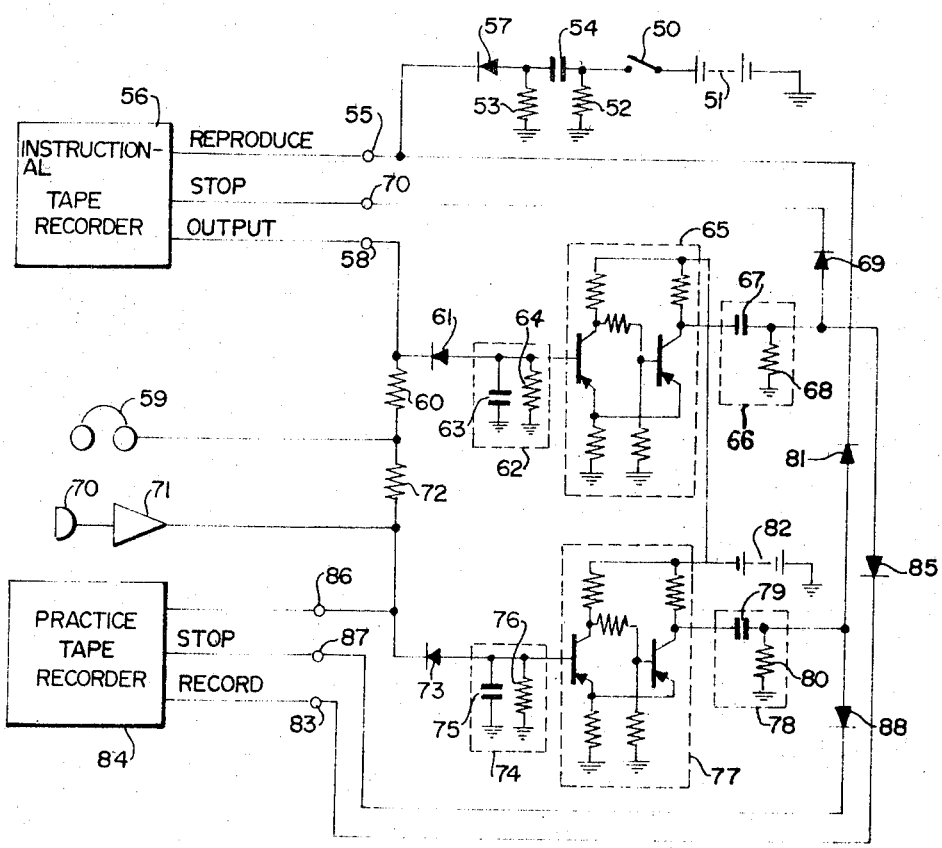

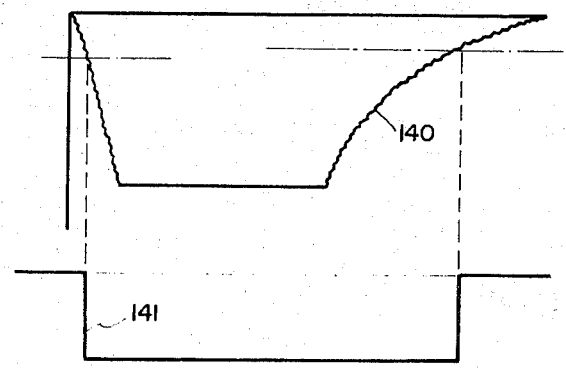
FIG.10(A)
FIG.10(B)
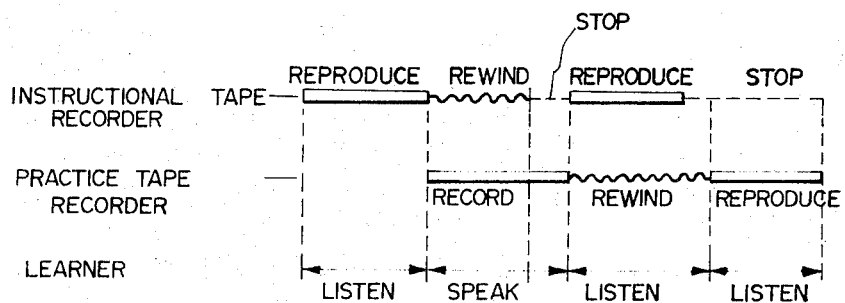
FIG.11
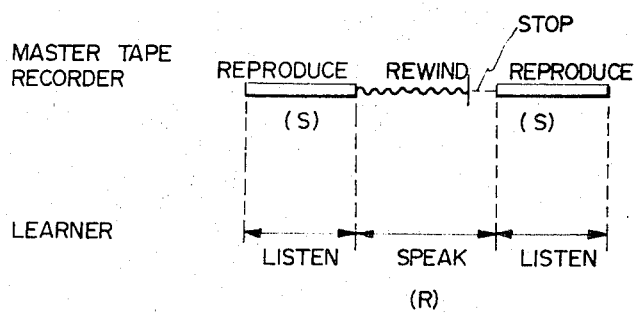
FIG.15

INVENTORS
TAKAO ORITA
MASAHIRO KOSAKA
TADAMASA FUJITA

3,550,289
ELECTRONIC LANGUAGE TEACHING SYSTEM
Takao Orita, Masahiro Kosaka, and Tadamasa Fujita, Osaka, Japan, assignors to Matsushita Electric Industrial Company Limited, Osaka, Japan
Filed Jan. 24, 1969, Ser. No. 793,769
Claims priority, application Japan, Jan. 25, 1968, 43/5,055, 43/5,056; Jan. 26, 1968, 43/4,725, 43/4,726
Int. Cl. G09b 5/04
U.S. Cl. 35—35
7 Claims

ABSTRACT OF THE DISCLOSURE

An electronic teaching apparatus. The apparatus comprises a reproducing means for reproducing an instructional tape which is supplied to an instructional tape recorder and which has an instructional program recorded intermittently thereon, and a plurality of practice tape recorders for recording and reproducing oral responses of a plurality of learners. A first detecting means is provided for detecting the moment when one of said instructional programs has been reproduced, and a first control means controls said instructional and practice tape recorders after receiving a detecting signal from said first detecting means. A second detecting means is provided for detecting the moment when the plurality of learners have finished their oral responses to said one of said instructional programs, and a second control means controls said instructional tape recorder and said practice tape recorders after receiving a detecting signal from said second detecting means.

---

This invention relates generally to a teaching apparatus using a tape recorder, and more particularly to a language teaching apparatus in which an instructional tape recorder and practice tape recorders operate alternatively for efficient learning of a foreign language.

In learning a foreign language it is considered to be quite useful for a learner to hear an instructional program repeatedly and to make oral responses to said instructional program. This repetitive hearing and speaking make it possible for a learner to understand and grasp an instructional program and to form proper linguistic habits in a foreign language.

The instructional tape recorder referred to herein is one in which the instructional program recorded on a magnetic tape is reproduced. Besides recording and reproducing, the instructional tape recorder can be rewound at a speed similar to that in a conventional recording and reproducing operation.

The instructional tape recorder is controlled by supplying a positive impulse to a control terminal, such as the stop control terminal, the reproducing control terminal and so on.

A control impulse causes the instructional tape recorder to carry out the corresponding operation, and the condition corresponding to this operation is maintained until another control impulse is supplied.

The practice tape recorder referred to herein is one in which the spoken response of a learner as well as the instructional program from the instructional tape recorder is recorded and reproduced. The operation of the practice tape recorder is similar to that of the instructional tape recorder.

Generally an instructional program is recorded on a magnetic tape with or without intervals between two succeeding instructional programs, which in practice are words or phrases. An instructional tape in which there is no suitable interval between programs requires the learner to stop the instructional tape recorder after the end of each program in order to respond to the instructional program, and further requires him to start the instructional tape recorder upon termination of his response. On the other hand, an instructional tape having a suitable interval between two succeeding programs does not require the learner to stop the instructional tape recorder for his response.

When a learner studying foreign languages with a conventional teaching apparatus wants to study the same instructional program repeatedly in order to gain a deeper understanding of the instructional program, the learner must rewind the instructional tape recorder over and over again. And when the learner wants to hear his recorded response and to compare it with the instructional program for better understanding, he must rewind the practice tape recorder and replay his response immediately after completing his response.

The conventional teaching apparatus thus requires the learner to carry out both intricate and frequent operations of both the instructional tape recorder and the practice tape recorder during study. Such operation is troublesome and prevents the efficient study of a foreign language.

Although a tape having suitable intervals between successive instructional programs makes it easy to operate the tape recorder, language teachers and learners must still carry out bothersome operations in performing repetitive study of the same instructional program.

It is quite time consuming and tedious to prepare an instructional tape having suitable intervals between programs. First, a language teacher records one phrase of the instructional program, predicts a suitable interval within which learners are expected to finish their oral response, waits for the end of the predicted interval, and only then starts recording of the next phrase. Therefore, the teacher must direct his attention to something which has nothing to do with the learning activiy itself.

Even more inconvenient is the problem that the predetermined interval doesn't always meet the demands of learners who have different experience in learning a foreign language. That is, for instance, a talented learner doesn't need a long interval to make an oral response to the instructional program and consequently when using a tape prepared for use by all types of learners, he has much time before hearing the next instructional program. This decreases such a learner's motivation for learning.

On the other hand, a handicapped learner may find the interval left by the teacher too short to make his oral response to the instructional program, and may require a longer interval.

It is an object of the present invention to provide the language teaching apparatus capable of eliminating these difficulties and inconveniences.

It is an object of the invention to provide a teaching apparatus which makes it possible for learners to study foreign languages easily and efficiently.

It is a further object of the invention to provide a teaching apparatus with which leraners can hear recorded instructional programs and respond to said instructional programs without carrying out any manual operations.

It is a still further object of the invention to provide a teaching apparatus with which learners can respond to recorded instructional programs while their responses are automatically being recorded on a practice tape recorder which can be used for comparison of their responses with the instructional programs.

It is a still further object of the invention to provide a teaching apparatus in which a practice tape recorder is coupled with detecting means and controlling means, whereby a tape having the responses recorded thereon is rewound and is reproduced automatically for comparison of the responses with the instructional programs.

These and other objects will become apparent from the following detailed description taken together with the accompanying drawings, wherein:

FIGS. 5A–5D are wave form patterns of signals of a detecting means as shown in FIG. 4;

FIG. 6 is a schematic diagram of a preferred embodiment of the invention in which a learner's response is recorded by a practice tape recorder;

FIGS. 10A and 10B are wave form patterns of signals of a detecting means shown in FIG. 9;

FIG. 11 is a sequence diagram of a preferred sequence of steps in a language learning process;

FIG. 15 is a sequence diagram of a preferred sequence of steps in a language learning process in which the learning activity is terminated by a correct instructional program.

Figure 1:
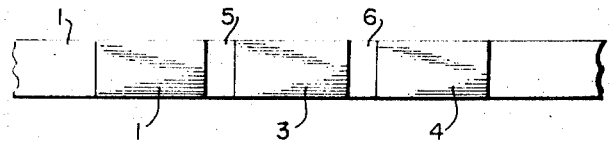
FIG. 1 is a schematic view of an instructional tape which has instructional programs successively recorded thereon with short blank intervals therebetween for clear separation of the successive instructional programs.

Referring now to the drawings, and more particularly to FIG. 1, the instructional tape 1 shown therein has instructional programs 2, 3 and 4 recorded successively to each other with short blank intervals 5 and 6 therebetween for the clear separation of each successive instructional program.

Figure 2:
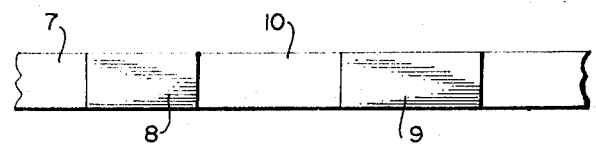
FIG. 2 is a schematic view of an instructional tape which has instructional programs successively recorded thereon with moderate length blank intervals therebetween to make it possible for learners to make their oral responses within these blank intervals.

Referring to FIG. 2, the instructional tape 7 shown therein has the instructional programs 8 and 9 recorded successively at suitable intervals 10 so as to enable a learner to finish his oral responses within these intervals.

Figure 3:
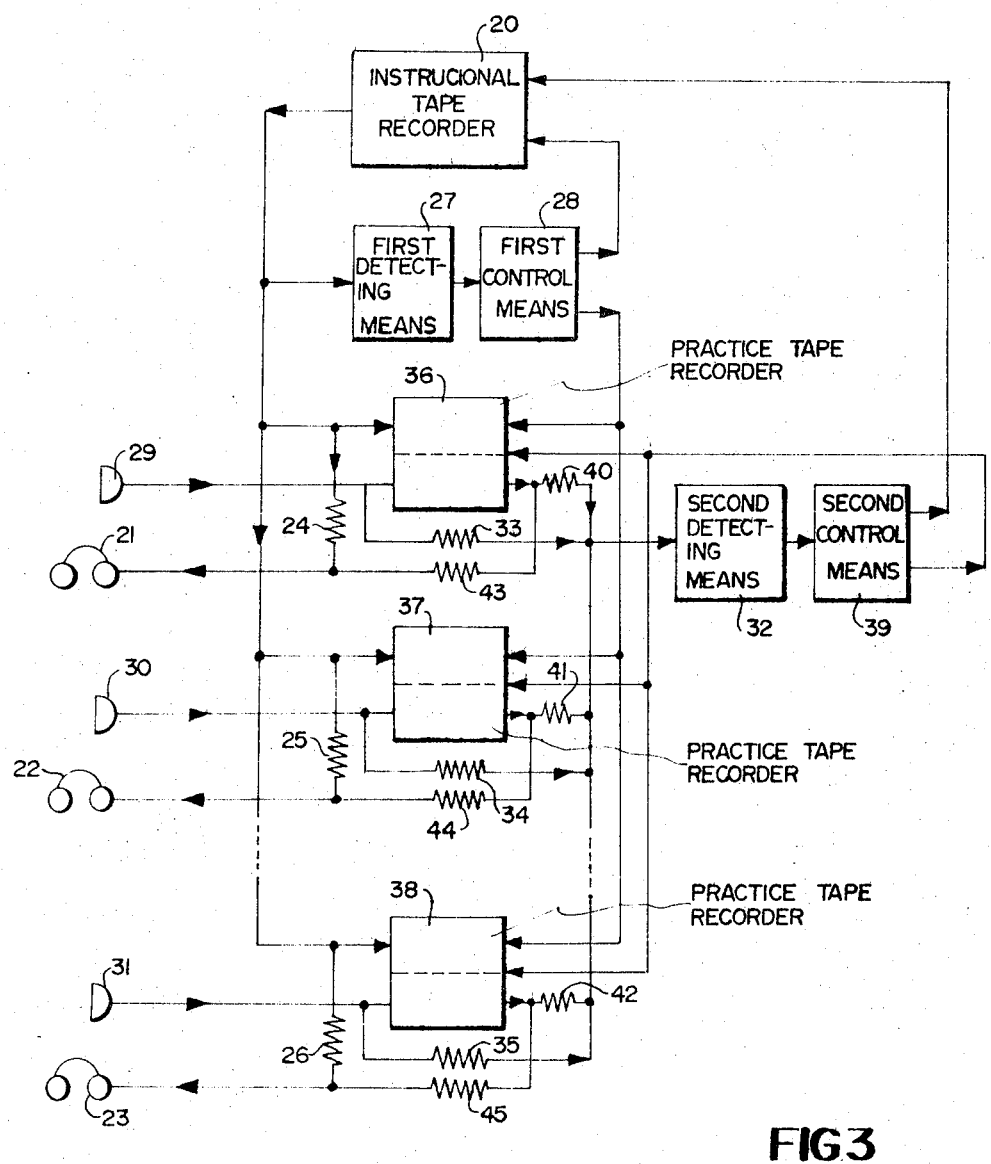
FIG. 3 is a schematic diagram of a fundamental electrical circuit of an electronic teaching apparatus according to the invention.

Before proceeding with a detailed description of the invention, the essence of the invention will be explained with reference to FIG. 3, which shows a circuit diagram of a fundamental electrical circuit of the teaching apparatus.

The instructional tape recorded 20, having a tape with instructional material intermittently recorded in a group of instructional programs, is set to carry out a reproducing operation by depressing a start button. Then the instructional tape recorder 20 reproduces the instructional program and the audio signal representing this reproduced instructional program is fed to a plurality of headphones 21, 22 and 23 through respective mixing resistors 24, 25 and 26, corresponding to the respective headphones 21, 22 and 23, and is simultaneously fed to a first detecting means 27.

The detecting means 27 referred to herein consists essentially of a combination of a rectifying circuit, an integrating circuit, a Schmitt trigger circuit, and a differentiating circuit, which will be explained later with reference to FIG. 4. However, the detecting means contemplated by the invention is not limited to this specific combination.

Upon being rectified by a diode in the detecting means 27, the audio signal from the instructional tape recorder 20 is smoothed by the integrating circuit in the detecting means 27 and is fed to the Schmitt trigger circuit in the detecting means 27. The Schmitt trigger circuit is characterized by two stable output levels: when the input signal level to the Schmitt trigger circuit is low, the output level stays at the lower stable level; and when the input signal level increases and exceeds a certain predetermined level, the output level jumps abruptly to the higher stable level; and when the input signal level decreases to a certain predetermined level, the output level drops abruptly to the lower stable level.

Therefore, when the instructional tape recorder 20 starts reproduction of the instructional program, the output signal from the integrating circuit in the detecting means 27 is caused by the detecting circuit to decrease to a certain predetermined level. Then the output level of the Schmitt trigger circuit in the detecting means 27 drops to the lower stable level and remains there while the instructional tape recorder 20 is reproducing the instructional program.

When one of the reproduced instructional program is finished, the output signal from the integrating circuit is caused to increase and exceeds a certain predetermined level. Then the output level of the Schmitt trigger circuit in the detecting means 27 jumps abruptly to the higher stable level.

The abrupt jump of the output level of the Schmitt trigger circuit in the detecting means 27 is differentiated by the differentiating circuit of the detecting means 27 into a positive impulse which acts as a detecting signal. This detecting signal from the first detecting means 27 is fed to a first control means 28 to control the instructional tape recorder 20 and practice tape recorders 36, 37 and 38 in a selected order to be described hereinafter.

The output audio signal from the instructional tape recorder 20 is also fed to first recording-reproducing channels of a plurality of practice tape recorders 36, 37 and 38.

Next, learners make their oral responses to the instructional program which has sounded through the headphones 21, 22 and 23. These oral responses are converted into audio signals by microphones 29, 30 and 31 and are fed to a second detecting means 32 through respective mixing resistors 33, 34 and 35 corresponding to the microphones 29, 30 and 31, and simultaneously are fed to the second recording-reproducing channels of the practice tape recorders 36, 37 and 38. The second detecting means 32 detects the moment when a predetermined percent of the learners finish their oral responses and generates a positive impulse in a way similar to that of the first detecting means 27. This positive detecting signal from the second detecting means 32 is fed to a second control means 39 to control the instructional tape recorder 20 and practice tape recorders 36, 37 and 38 in a selected order to be described hereinafter. Reproduced signals from the second recording-reproducing channels of the practice tape recorders 36, 37 and 38 are fed to the second detecting means 32 through respective mixing resistors 40, 41 and 42, and are fed simultaneously to the headphones through respective resistors 43, 44 and 45.

The teaching apparatus according to the invention makes it possible for learners to proceed in their learning activity at a speed convenient to them as individuals without the help of a teacher.

Any circuit having functions essentially equivalent to those described above can be employed.

Figure 4:
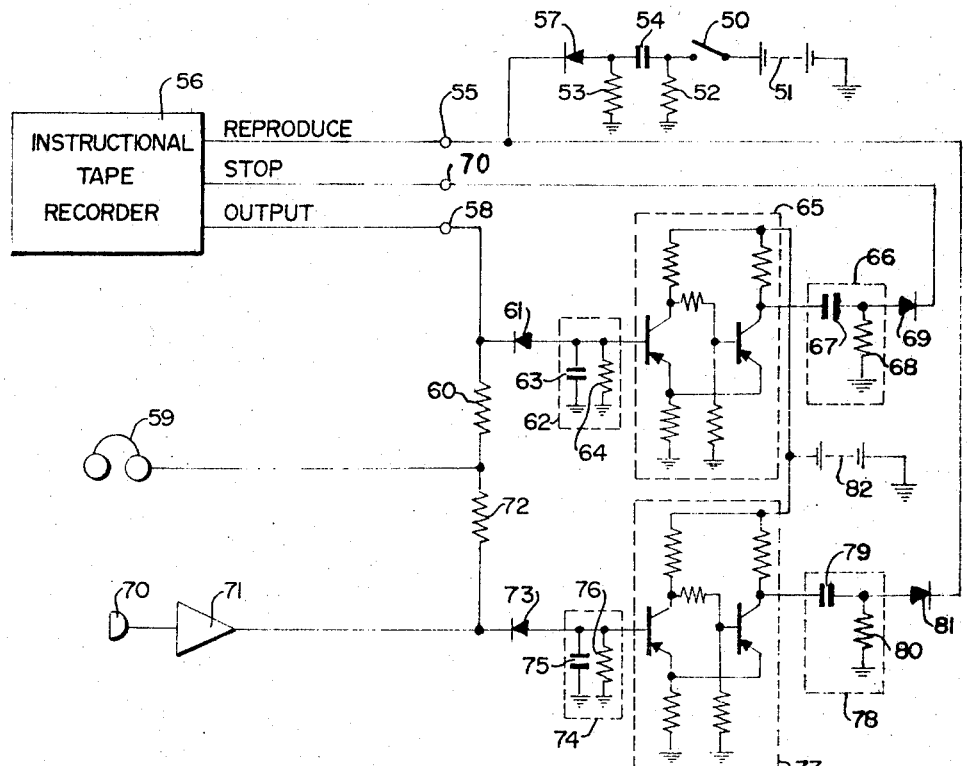
FIG. 4 is a schematic diagram of a preferred embodiment of the apparatus according to the invention by which a learner can study at a convenient speed.

Referring to FIG. 4, which shows a circuit for an apparatus with which a student can study at a convenient speed, a study start switch 50 is closed and a voltage source 51 is differentiated by a circuit consisting of resistors 52 and 53 and capacitor 54, into an impulse which is to be supplied to a reproducing control terminal 55 of an instructional tape recorder 56 through a diode 57.

Thus the instructional tape recorder 56 is operated to reproduce an instructional program in the form of an audio signal. This reproduced audio instructional signal enters an output terminal 58. This audio instruction signal is supplied to a headphone 59 for a learner through a mixing resistor 60 so that the learner can hear the instructional program. Simultaneously, the instructional signal is rectified by a diode 61 and then is smoothed by an integrating circuit 62 which includes a capacitor 63 and a resistor 64.

The signal from the integrating circuit 62 is fed to a Schmitt trigger circuit 65 so as to modify the wave from thereof.

This circuit is for detecting the moment when reproduction of one of the instructional programs is finished. Referring to FIGS. 5A–5D, FIG. 5A and FIG. 5B show the output signal from the instructional tape recorder 56 and a signal rectified by said diode 61, respectively. FIG. 5C and FIG. 5D show a signal from the integrating circuit 62 and an output signal from the Schmitt trigger circuit 65, respectively. Thus, the Schmitt trigger circuit 65 generates a signal shown in FIG. 5D while the instructional program is being reproduced.

When the reproduction of one of the instructional programs ends and the magnetic reproducing head of the instructional tape recorder scans an interval 5 the abruptly increased output signal from the Schmitt trigger circuit 65 is differentiated by a differential circuit 66 consisting of a capacitor 67 and a resistor 68 into a positive impulse which is fed through a diode 69 to a stop control terminal 70 of the instructional tape recorder 56. Therefore, the instructional tape recorder 56 stops automatically when one of the instructional programs ends.

An oral response to the instructional program made by a learner is converted to an audio signal by a microphone 70 and is amplified by an amplifier 71. This response signal made by the learner is supplied to a headphone 59 of the learner through a mixing resistor 72. Simultaneously, the response signal is rectified by a diode 73 and smoothed by an integrating circuit 74 consisting of a capacitor 75 and a resistor 76. The signal from the integrating circuit 74 is fed to a Schmitt trigger circuit 77 to modify the wave form thereof. The operation of the Schmitt trigger circuit 77 is identical to that of the Schmitt trigger circuit 65 explained previously. The output level of the Schmitt trigger circuit 77 stays at the lower stable level while the learner is continuing his response and then jumps to the higher stable level when the response of the learner ends. The output signal from the Schmitt trigger circuit 77 is differentiated by a differential circuit 78 consisting of a capacitor 79 and a resistor 80 into a positive impulse, and this impulse is supplied through a diode 81 to the reproducing control terminal 55 of the instructional tape recorder 56.

A battery 82 is provided for supplying voltage to the Schmitt trigger circuits 65 and 77.

Consequently, a reproduction of the instructional program and an oral response to the instructional program are alternatively carried out without manual operation of the tape recorder 56. Therefore, a learner can continue his study automatically at his most convenient speed.

It is also possible to operate a practice tape recorder while the learner is talking and to stop the practice tape recorder when the learner stops talking in order to keep the amount of magnetic tape used by the practice tape recorder to a minimum. A preferred embodiment of a circuit according to the invention for carrying out this type of operation is shown in FIG. 6. The circuit of FIG. 6 has all of the elements of the circuit of FIG. 4, and in addition has a practice tape recorder 84 with a reproducing control terminal 83, a stop control terminal 87, and an input terminal 86. The input terminal 86 is connected to the amplifier 71, the stop control terminal 87 is connected to the differential circuit 78 through diode 88, and reproducing control terminal 83 is connected to differential circuit 66 through diode 85.

In operation, the Schmitt trigger circuit 65 generates an impulse in association with the differential circuit 66, when a reproduction of the instructional program reproduced by the instructional tape recorder 56 ends. This impulse is fed to the recording control terminal 83 of the practice tape recorder 84 through the diode 85. Thus, the practice tape recorder 84 is caused to record so as to record an oral response of the learner through the input terminal 86. Thereafter, the Schmitt trigger circuit 77 produces an impulse in association with the differential circuit 78 when the learner has finished his oral response. This impulse is fed to the stop control terminal 87 of the practice tape recorder 84 through the diode 88. Therefore, the practice tape recorder 84 operates only while the learner is making his oral response.

Another variation of the present invention is one in which the instructional tape recorder has two recording-reproducing channels.

In the electronic teaching apparatus explained so far, the operation of the tape recorders is controlled by an audio signal such as a recorded instructional program or an oral response made by a learner. In such case, however, the time constant of the detecting circuit is given a large value so that a small break in a normal audio signal does not cause erroneous operation. The detecting circuit can be set to permit a pause of 1 or 2 seconds. Consequently the practice tape recorder is caused to start a recording operation 1 or 2 seconds after the end of the instructional program. This fact causes monotonous progress of the learning activity and a low motivation of the learner.

A special control signal can be recorded on another recording-reproducing channel of the instructional tape recorder.

Figure 7:
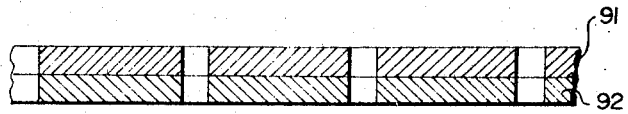
FIG. 7 is a schematic view of an instructional tape in which a control signal is recorded at a position corresponding to the instructional program.

Referring to FIG. 7, the instructional tape here shown has two recording-reproducing channels. The instructional program is recorded on the upper recording-reproducing channel 91 and a control signal is recorded on the lower recording-reproducing channel 92 at positions corresponding to the positions of the parts of the instructional program. This control signal is recorded continuously while the instructional program is proceeding. Therefore, it is possible to detect the control signals by a detecting circuit having a much smaller time constant instead of detecting the instructional program itself.

Consequently, both the instructional and the practice tape recorder operate more quickly than the apparatus described previously. This control signal can be any kind of audio signal having a constant frequency and amplitude.

Another embodiment of the present invention will be described in which the tape for the practice tape recorder has two recording-reproducing channels.

Figure 8:
FIG. 8 is a schematic view of a magnetic tape recorded by a practice tape recorder.

In the teaching apparatus described so far, a learner can hear his recorded response again by using the practice tape recorder. As shown in FIG. 8, the tape for the practice tape recorder of the present embodiment has two recording-reproducing channels. The instructional program reproduced from the instructional tape recorder is recorded on the upper recording-reproducing channel 93 and the oral response of the learner is recorded on the lower recording-reproducing channel 94. Thus, the tape for the practice tape recorder having two recording-reproducing channels makes it possible for the learner to practice the same instructional program repeatedly without using the instructional tape recorder.

Another embodiment of the present invention will be described in which a plurality of learners can carry out their learning activity while sharing one instructional tape recorder.

In group study, the learners each have their own learning speeds and abilities. Therefore, even if they start their responses at the same time, they finish their responses at different times from each other. In such group study, the instructional program can be started by detecting the moment when all learners have finished their responses. But in this case many learners have to wait for the next instructional program until the slowest learner in the group finishes his response. Thus the study progresses very slowly.

The learning activity of the novel teaching apparatus of the present invention is controlled by detecting the moment when a predetermined percent of the learners, such as 80–90 percent, have finished their responses.

Figure 9:
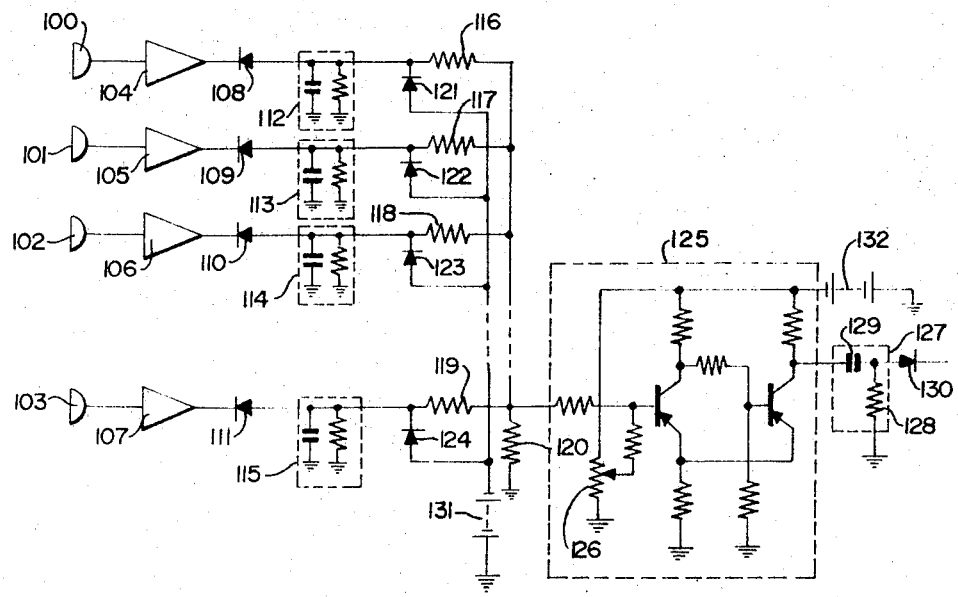
FIG. 9 is a schematic diagram of a detecting means which detects the time when a predetermined percent of the learners have finished their responses.

Referring to FIG. 9, which shows such a control system, the responses of the learners are converted into audio signals by microphones 100, 101 . . . 103, are amplified by amplifiers 104, 105 . . . 107, and are rectified by diodes 108, 109 . . . 111, and fed to integrating circuits 112, 113 . . . 115, respectively. These integrating circuits 112, 113 . . . 115 are used to smooth the rectified audio signal. The smoothed audio signals are mixed through mixing resistors 116, 117 . . . 119 and 120.

The clamping diodes 121, 122 . . . 124 modify the output signals from the integrating circuits 112, 113 . . . 115 to a constant level in order to cancel the differences in the signal levels due to the different levels of the responses and the distances between the microphones and the learners' mouths.

The mixed signal from the mixing resistors drives a Schmitt trigger circuit 125 similar to that of FIG. 4. When a plurality of learners start their responses, the input signal to the Schmitt trigger circuit 125 decreases and switches the Schmitt trigger circuit 125.

After a while the plurality of learners finish their responses one after another. This results in an increase in the input signal fed to the Schmitt trigger circuit 125. When this input signal exceeds a certain predetermined level, the Schmitt trigger switch 125 switches again to the normal state. This switching level can be adjusted by a variable resistor 126 built into the Schmitt trigger circuit 125.

The output signal from the Schmitt trigger circuit 125 is differentiated by a differential circuit 127 consisting of a resistor 128 and a capacitor 129 into an impulse. This impulse is fed through a diode 130 to the instructional tape recorder in the same manner as described with reference to FIG. 4 and FIG. 6. Batteries 131 and 132 supply a clamping voltage and Schmitt trigger circuit working voltages, respectively.

FIG. 10 is a diagram showing the wave forms of the input signal 140 and output signal 141 of the Schmitt trigger circuit 125. This detecting circuit makes it possible to carry out group study wherein a plurality of learners share one instructional tape recorder.

A further embodiment of the present invention will be described in which the learner's response is recorded onto the tape of a practice tape recorder and is reproduced automatically in order to increase the learning effectiveness.

Referring to FIG. 11, a sequence diagram of an operation of both an instructional tape recorder and a practice tape recorder is described. Frist the instructional tape recorder reproduces the instructional programs. Next the instructional tape recorder is rewound at a speed similar to that of the reproducing operation when one of the instructional programs has been reproduced, and simultaneously the practice tape recorder is caused to carry out a recording operation so as to record the learner's oral response onto the tape of the practice tape recorder. Next, the instructional tape recorder reproduces the same instructional program again while the practice tape recorder is being rewound at a speed similar to that of a recording operation. Then, the practice tape recorder reproduces the recorded learner's earlier response while the instructional tape recorder is stopped. Thereafter, the instructional tape recorder is caused to carry out a reproducing operation in order to reproduce the next instructional program after the reproduction of the learner's recorded response has been finished. The action of the learner is also shown during these successive periods.

Figure 12:
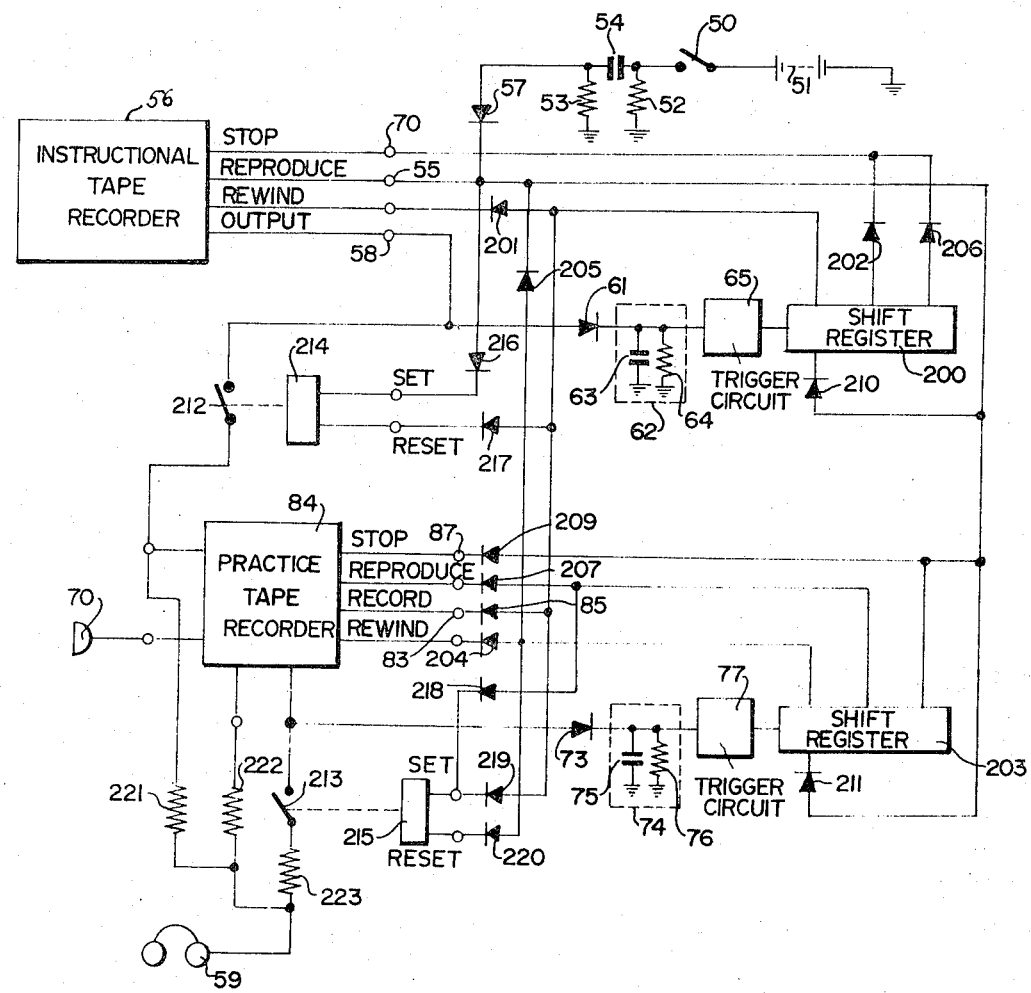
FIG. 12 is a schematic diagram of a preferred embodiment of the invention for carrying out the sequence of FIG. 11 and in which a learner's response is recorded into and reproduced from a practice tape recorder automatically.

Referring to FIG. 12, which shows a circuit diagram of a system for carrying out such a program, and in which parts similar to those of FIG. 6 have the same reference numerals, depression of a study start button 50 causes the instructional tape recorder 56 to be driven so as to reproduce the tape, and a learner can hear the instructional program through the headphone 59. Next, when reproduction of one of the instructional programs ends, the Schmitt trigger circuit 65 produces, in association with a differentiating circuit (not shown) like that at 66 in FIG. 6, a first impulse which operates a shift register 200 to change the memory condition of the bits to change the register from its initial condition (1, 0, 0) to a changed condition (0, 1, 0). The change of the memory condition of the left most bit of the shift register 200 from "1" to "0" produces an impulse in association with the operation of the differentiating circuit. This impulse is fed to the rewind terminal of the instructional tape recorder 56 through a diode 201. Simultaneously, this impulse is fed to the record control terminal 83 through a diode 85 in order to cause the practice tape recorder 84 to carry out a recording operation.

The shift register referred herein is one in which the memory condition of each bit of the shift register is shifted toward the right by one bit when one shift pulse is applied to it. The initial memory condition is usually indicated as (1, 0, 0), for instance, when the shift register has three bits. The memory condition of each bit of the shift register is denoted either by "0" or "1" and each bit has two stable conditions. The stable conditions correspond to "0" and "1," respectively.

The change from one stable condition to another stable condition causes an abrupt change in output level of the shift register. This abrupt change produces an impulse in association with the operation of the differentiating circuit in a conventional way.

Thus the instructional tape recorder 56 is rewound while the practice tape recorder 84 is recording an oral response of the learner through the microphone 70. Generally the duration of an oral response of the learner is longer than the rewinding time for the instructional tape recorder 56. Thus the Schmitt trigger circuit 65 returns to its initial condition upon termination of the reverse direction audio signal from the instructional tape recorder 56, and generates in association with the differentiating circuit, a second impulse, which operates the shift register 200 to change the memory condition of the bits to change the register from its condition (0, 1, 0) to a further changed condition (0, 0, 1). The change of the memory condition of the middle bit of the shift register 200 from "1" to "0" produces an impulse in association with an operation of the differentiating circuit. This impulse is fed to the stop terminal 70 of the instructional tape recorder 56 through a diode 202 to stop the instructional tape recorder 56. Next, the termination of the oral response of the learner brings the Schmitt trigger circuit 77 to its initial condition and this produces an impulse, in association with the operation of a differentiating circuit (not shown) like that at 78 in FIG. 6, 76, which operates a shift register 203 to change the memory of the bits to change the register from its initial condition (1, 0, 0) to a first changed condition (0, 1, 0). When the memory condition of the left most bit of the shift register 203 changes from "1" to "0," an impulse is generated in association with the differentiating circuit which is fed to the rewind terminal of the practice tape recorder 84 through a diode 204 to rewind the practice tape recorder.

Simultaneously, this impulse is fed to the reproducing control terminal 55 of the instructional tape recorder 56 through diode 205 in order to cause the instructional tape recorder 56 to carry out a reproducing operation. Thus the learner can hear the same instructional program again immediately after his response. Generally the duration of the reproducing time of the instructional tape recorder 56 is shorter than the rewinding time of the practice tape recorder 84. Thus the Schmitt trigger circuit 65 returns to its initial condition when the reproduced signal from the instructional tape recorder 56 ends. This produces an impulse in association with an operation of the differentiating circuit, which operates the shift register 200 to change the memory condition of the bits to change the register from its condition (0, 0, 1) to a final condition (0, 0, 0). The change of the memory condition of the right-most bit of the shift register 200 from "1" to "0" produces an impulse in association with the differentiating circuit, which is fed to the stop terminal 70 of the instructional tape recorder 56 through a diode 206 to stop the tape recorder 56. The Schmitt trigger circuit 77 is then changed to its initial condition when the reverse direction audio signal of the recorded learner's response has ended. This produces an impulse in association with the operation of the differentiating circuit, which operates the shift register 203 to change the memory condition of the bits to change the register from its condition (0, 1, 0) to (0, 0, 1). When the memory condition of the middle bit of the shift register 203 changes its condition from "1" to "0" this produces an impulse in association with the operation of the differentiating circuit which is fed to the reproduce terminal of the practice tape recorder 84 through a diode 207. Consequently, the oral response of the learner is reproduced automatically. At the termination of the reproduction of the recorded oral response of the learner, the Schmitt trigger circuit 77 is returned to its initial condition. This produces an impulse in association with the operation of the differentiating circuit whch operates the shift register 203 to change its condition (0, 0, 1) to (0, 0, 0) in the manner described above. When the memory condition of the right most bit of the shift register 203 changes its condition form "1" to "0," this produces an impulse, as described above, which is fed to reproduce terminal 55 of the instructional tape recorder 56 through a diode 208. Simultaneously this impulse is fed to the stop control terminal 87 of the practice tape recorder 84 through diode 209 and causes the practice tape recorder to stop operation. Consequently the learner finishes one cycle of learning activity automatically. The impulse generated when the right most bit of register 200 changes its condition from "1" to "0" resets both shift registers. This impulse is fed to the left most bits of the shift registers 200 and 203 through diodes 210 and 211, respectively, to change the conditions of these bits from "0" to "1."

In addition, switching means 212 and 213 are provided to prevent the reverse audio signals reproduced when the recorders are rewinding from flowing into the learner's headphone 59 and disturbing the learning activity. These switching means 212 and 213 are driven so as to be closed by flip-flop circuits 214 and 215, respectively, when these flip-flop circuits are set. The flip-flop circuits 214 and 215 are set and reset through diodes 216, 217, 218, 219 and 220, when corresponding tape recorders are caused to operate to reproduce or record and rewind operation, respectively. Resistors 221, 222, and 223 are used as mixing resistors for mixing the audio signal supplied to the headphone 59.

A further embodiment of the invention will be described in which the same instructional program is reproduced repeatedly in order to assure a better formation of the language skill. In a conventional teaching apparatus the same instructional program is recorded on the tape of the instructional tape recorder several times so that a learner can study the same instructional program repeatedly. This not only makes preparation of an instructional tape inconvenient, but also makes it unsuitable for different learners who have different experience in studying a foreign language. The present embodiment provides a solution to this problem.

Figure 13:
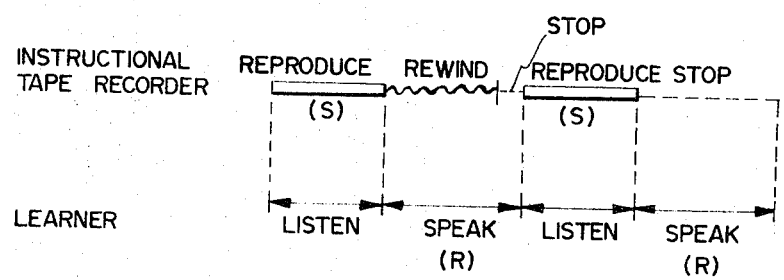
FIG. 13 is a sequence diagram of another preferred sequence of steps in a language learning process.

Referring to FIG. 13, in the method shown, the same instructional program is used twice, for instance, but it can be used three or more times if it is desired.

First an instructional program (S) is reproduced from the instructional tape recorder. Next, the instructional tape recorder rewinds automatically at a speed similar to that of the reproducing operation immediately after the termination of the reproduction of the instructional program. Simultaneously the learner starts his response (R) according to the instructional program just heard. Generally the duration of the learner's response is longer than the reproducing time of the instructional program being reproduced in the reverse direction. Rewinding of the instructional tape recorder is terminated first and this termination is detected automatically and the detecting signal stops the instructional tape recorder. Next, the response of the learner is terminated. This termination of the learner's response is detected automatically and the detecting signal again starts the instructional tape recorder in a reproducing operation to start the second learning process of the learning activity. In the second part of this learning activity the reproducing of the instructional program is terminated first and this termination is detected automatically and the detecting signal stops the instructional tape recorder. Simultaneously the learner starts his second response (R) according to the instructional program. Thereafter, the response of the learner is terminated. This termination of the learner's response is detected automatically and the detecting signal causes the instructional tape recorder to start the reproducing operation for the reproduction of the next instructional program.

Consequently the same instructional program is used two times automatically.

Figure 14:
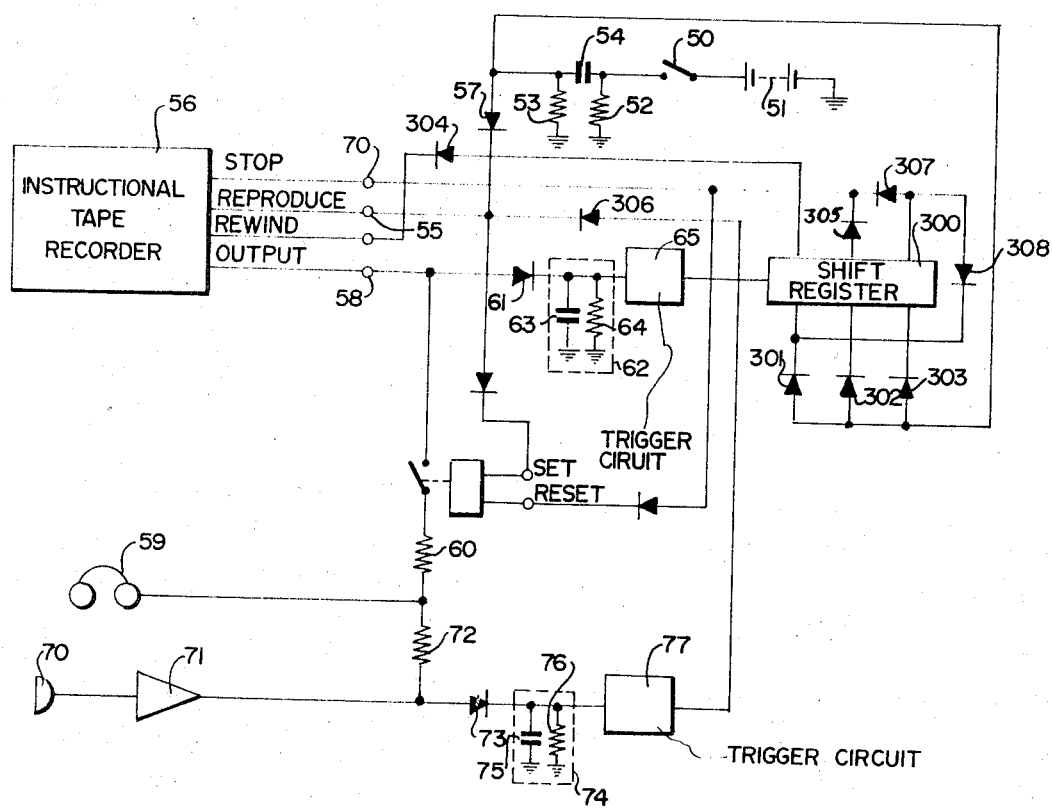
FIG. 14 is a schematic diagram of a preferred embodiment of the invention for carrying out the sequence of FIG. 13, and in which the same instructional program is used repeatedly.

An apparatus for carrying out this method is shown in FIG. 14 in which parts the same as those in FIG. 4 have the same reference numbers. The instructional tape recorder 56 reproduces the instructional program when a study start button 50 is depressed. Simultaneously the study start impulse is fed to a shift register 300 through diodes 301, 302 and 303 and set the internal condition of the register with the memories of the bits in the conditions (1, 0, 0) when the study start button 50 is depressed. Thereafter, the Schmitt trigger circuit 65 is placed in its initial condition when one of the instructional programs has been completely reproduced, and generates an impulse, in association with a differentiating circuit (not shown), which operates to change the memory conditions of the bits of the shift register so as to change the shift register 300 from its initial condition (1, 0, 0) to the condition (0, 1, 0). When the memory condition of the left most bit of the shift register 300 changes its condition from "1" to "0," this produces an impulse, in association with the operation of the differentiating circuit, which is fed to the rewind terminal of the instructional tape recorder 56 through diode 304.

Next, the learner starts his response immediately after the termination of the reproduction of the instructional program. Generally the duration of the learner's response is longer than that of the instructional program. Thus the Schmitt trigger circuit 65 is placed in its initial condition upon termination of the reverse audio instructional signal produced by the instructional tape recorder 56 during rewinding. This produces an impulse, in association with the operation of the differentiating circuit, which operates to shift the shift register 300 from its then existing internal condition (0, 1, 0) to the condition (0, 0, 1). When the memory condition of the middle bit of the shift register 300 changes its condition from "1" to "0," this change produces an impulse, in association with the operation of the differentiating circuit, which is fed to the stop terminal of the instructional tape recorder 56 through a diode 305. Upon the termination of the oral response of the learner, the first learning cycle is ended. At this time the Schmitt trigger circuit 77 is placed in its initial condition, and this produces an impulse, in association with the operation of the dfferentiating circuit, which is fed to the reproduce terminal 55 of the instructional tape recorder 56 through a diode 306 to start the instructional tape recorder 56 on the next reproducing cycle. The termination of the second cycle of the instructional program is detected by the Schmitt trigger circuit 65 and produces an impulse, in association with the operation of the differentiating circuit, which operates the shift register 300 to shift it from its internal condition (0, 0, 1) to the condition (0, 0, 0). When the right most bit of the shift register 300 changes its condition from "1" to "0," this produces an impulse, in association with the operation of the differentiating circuit, which is fed to the stop terminal of the instructional tape recorder 56 through a diode 307. Next the termination of the oral response of the learner brings the Schmitt trigger circuit 77 to its intial condition and this produces an impulse, in association with the operation of the differentiating circuit, which is fed to the reproduce terminal 55 of the instructional tape recorder 56 through a diode 306 so as to start the next learning activity by reproducing a new instructional program. The impulse from the change in condition of the third memory bit of shift register 300 is fed to the shift register 300 through a diode 308 to reset the shift register to the condition (1, 0, 0).

A further embodiment of the present invention can be used to carry out a method in which the same instructional program is reproduced twice in order to assure correct memorization of the learner.

In the teaching apparatus described above, one cycle of the learning activity is terminated by either a learner's response or reproduction of the recorded learner's response. Therefore it is quite possible for the learner to memorize the learner's incorrect pronunciation or context of a sentence. It is, consequently, the object of the further embodiment of this invention to terminate one cycle of the learning activity with a correct instructional program.

FIG. 15 shows a diagram of a method in which the same instructional program is reproduced at the termination of one cycle of the learning activity.

First, an instructional program (S) is reproduced from the instructional tape recorder. Next the instructional tape recorder rewinds automatically at a speed similar to that of the reproducing operation immediately after the termination of reproduction of the instructional program. Simultaneously the learner starts his response (R) according to the instructional program. Generally the duration of the learner's response is longer than that of reproduction of the instructional program. Rewinding of the instructional tape recorder finishes first, and this finish is detected automatically and stops the instructional tape recorder. Thereafter the response of the learner is terminated, and this termination of the learner's response is detected automatically and the detecting signal starts the instructional tape recorder on a reproducing operation again. Consequently the learner completes the learning activity by hearing the correct instructional program.

The circuit diagram shown in FIG. 14 can be changed as explained hereinafter to provide an apparatus to carry out this embodiment of the invention.

Referring to FIG. 14, the removal of diode 307 effects the desired operation in which the learner can complete a cycle by hearing the correct instructional program.

Although preferred embodiments of the invention have been set forth in detail, it is desired to emphasize that they are not intended to be exhaustive or necessarily limitative; on the contrary, the disclosure herein is for the purpose of illustrating the invention and thus to enable others skilled in the art to adapt the invention in such ways as meet the requirements of particular applications, it being understood that various modifications may be made without departing from the scope of the invention.

What is claimed is:

1. An electronic teaching apparatus comprising, in combination, an instructional tape recorder for reproducing an instructional tape which has instructional programs recorded intermittently thereon, a plurality of practice tape recorders for recording and reproducing oral responses of a plurality of learners, a first detecting means coupled to said instructional tape recorder for detecting the moment when one of said instructional programs has been reproduced, a first control means coupled to said first detecting means and to said instructional tape recorder and said practice tape recorders for controlling said instructional and practice tape recorders in response to a detecting signal from said first detecting means, a second detecting means coupled to said practice tape recorders for detecting the moment when a plurality of learners have finished their oral responses to said one of said instructional programs, and a second control means coupled between said second detecting means and said practice tape recorders and said instructional tape recorder for controlling said instructional tape recorder and said practice tape recorders in response to the signal from said second detecting means.

2. An electronic teaching apparatus as claimed in claim 1 wherein the instructional tape recorder has a stop terminal to which the first control means is connected, and a reproduce terminal to which the second control means is connected, whereby the control signal from said first control means stops said instructional tape recorder when said one of said instructional programs has finished, and the control signal from said second control means starts said instructional tape recorder in a reproducing operation when said oral response of said plurality of learners have finished.

3. An electronic teaching apparatus as claimed in claim 1 wherein the instructional tape recorder has a stop terminal to which the first control means is connected and a reproduce terminal to which the second control means is connected, and said practice tape recorders each have a record terminal to which said first control means is connected and a stop terminal to which said second control means is connected, whereby a control signal from said first control means stops said instructional tape recorder and starts said practice tape recorders in a recording operation when said one of said instructional programs has finished, and a control signal from said second control means starts said instructional tape recorder in a reproducing operation and simultaneously stops said practice tape recorders when the oral response of a learner is finished.

4. An electronic teaching apparatus as claimed in claim 1 wherein said instructional tape recorder has two recording-reproducting channels, one of which records and reproduces said instructional programs, and another of which reproduces a control signal which is recorded at the corresponding position to said instructional programs, said first detecting means being coupled to said instructional tape recorder for detecting said control signal.

5. An electronic teaching apparatus as claimed in claim 1 wherein said second detecting means includes means for detecting the moment when a predetermined percent of learners have finished their oral responses.

6. An electronic teaching apparatus as claimed in claim 1 wherein said instructional tape recorder has a rewind terminal and a stop terminal to which said first control means is connected and said first control means includes means for supplying a signal to said rewind terminal for rewinding said instructional tape recorder, and said instructional tape recorder has a rewind speed similar to that of the tape during the recording-reproducing operation, and the first control means including means for supplying a control signal to the stop terminal of said instructional tape recorder when said tape is rewound, said second control means supplying a signal to said instructional tape recorder to start a reproducing operation when said oral responses of said plurality of learners have finished.

7. An electronic teaching apparatus as claimed in claim 1 wherein said instructional tape recorder has a rewind terminal and a reproduce terminal to which said second control means is connected, and said practice tape recorders each have a stop terminal, a reproduce terminal and a rewind terminal to which said second control means is connected and a record terminal to which said first control means is connected, and said first control means includes means for supplying a control signal to the rewind terminal of said instructional tape recorder for rewinding said instructional tape recorder and for supplying a control signal to the record terminal of said practice tape recorders for starting the practice tape recorders on a record operation when one of said instructional programs is ended, and for supplying a control signal to the stop terminal of said instructional tape recorder when the tape is rewound, and said second control means includes means for supplying a control signal to the rewind terminal of said practice tape recorders and the reproduce terminal of said instructional tape recorder when the responses of said plurality of learners have ended, and for supplying a control signal to the reproduce terminal of said practice tape recorders when the program of the instructional tape is ended, and for supplying a control signal to the stop terminal of the practice tape recorders and the reproduce terminal of the instructional tape recorders when the responses played by the practice tape recorder are ended.

References Cited

UNITED STATES PATENTS

| 2,553,410 | 5/1951 | Handshin | 179—100.1 |
| 3,156,052 | 11/1964 | Irazoqui | 35—35 |
| 3,269,033 | 8/1966 | Redfield et al. | 35—35 |
| 3,405,461 | 10/1968 | Joslow | 35—35 |
| 3,461,249 | 8/1969 | Kamoji et al. | 179—100.2 |

WILLIAM H. GRIEB, Primary Examiner

U.S. Cl. X.R.

179—100.1